United States Patent
Pelton

[11] 3,722,139
[45] Mar. 27, 1973

[54] CONTAINERIZED TREE SEEDLING UNITS AND METHOD OF MAKING THESE UNITS

[76] Inventor: Norman R. Pelton, 12127 York Avenue, Haney, British Columbia, Canada

[22] Filed: Nov. 5, 1970

[21] Appl. No.: 87,201

Related U.S. Application Data

[63] Continuation-in-part of Ser. No. 757,991, Sept. 6, 1968, abandoned.

[52] U.S. Cl..........................................47/58, 47/37
[51] Int. Cl. ................................................A01g 9/10
[58] Field of Search...............................47/34, 37, 1

[56] References Cited

UNITED STATES PATENTS 2,757,841  8/1956  Chapman ..............................47/37 X

FOREIGN PATENTS OR APPLICATIONS 79,169    6/1950  Czechoslovakia.........................47/37
195,263   3/1923  Great Britain

*Primary Examiner*—Robert E. Bagwill
*Attorney*—Fetherstonhaugh & Co.

[57] ABSTRACT

A containerized tree seedling unit including an elongated container around the roots of a tree seedling and made of a clay-like mud in and around the roots, and means for maintaining the container in a semi-rigid state for handling, storing and planting purposes. Peat moss and/or fertilizer may be included in the mud. A method of producing this containerized unit which includes pressing a body of moist clay-like material into and around the root system of the seedling to form the container.

7 Claims, 16 Drawing Figures

PATENTED MAR 27 1973
3,722,139
SHEET 1 OF 3
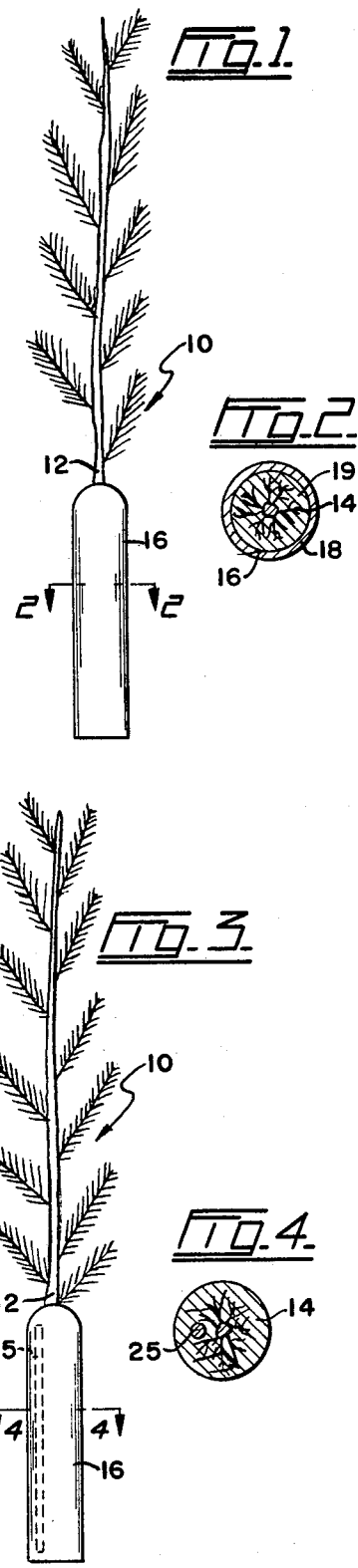
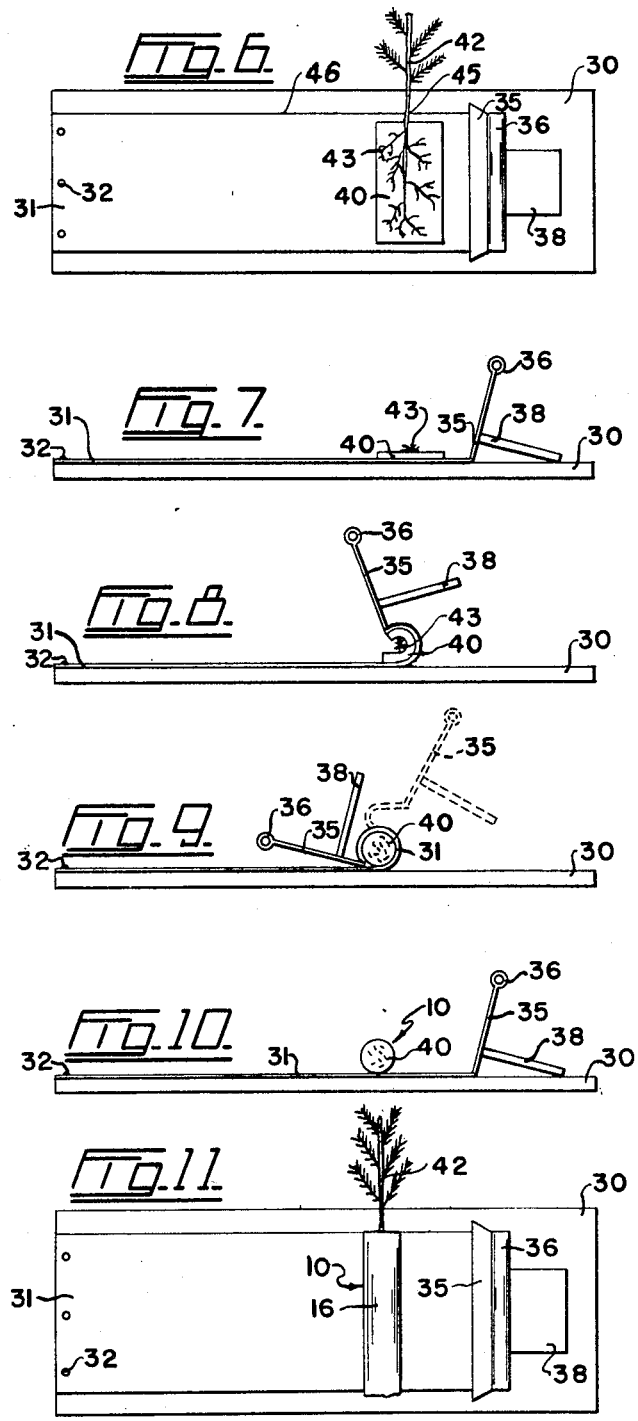
INVENTOR
NORMAN R. PELTON
BY
Fetherstonhaugh & Co.
ATTORNEYS

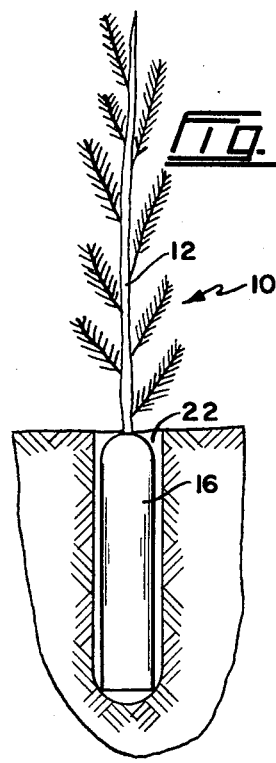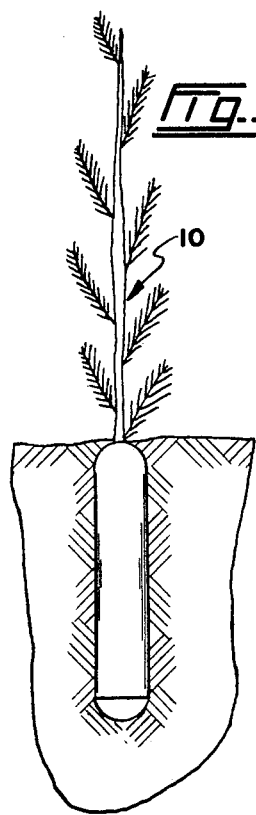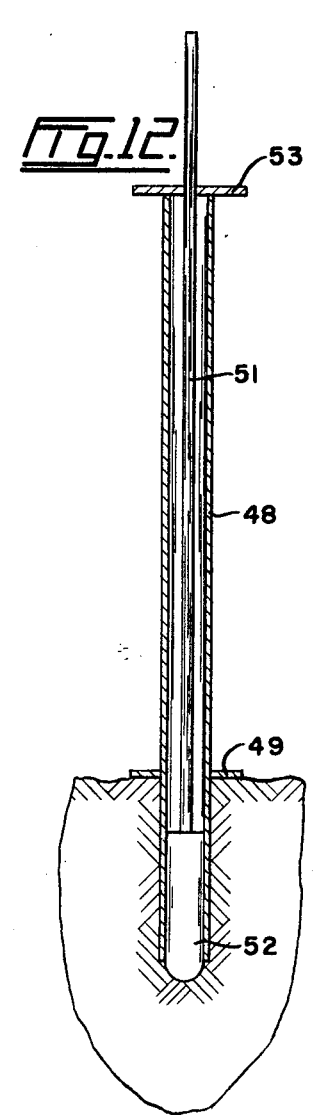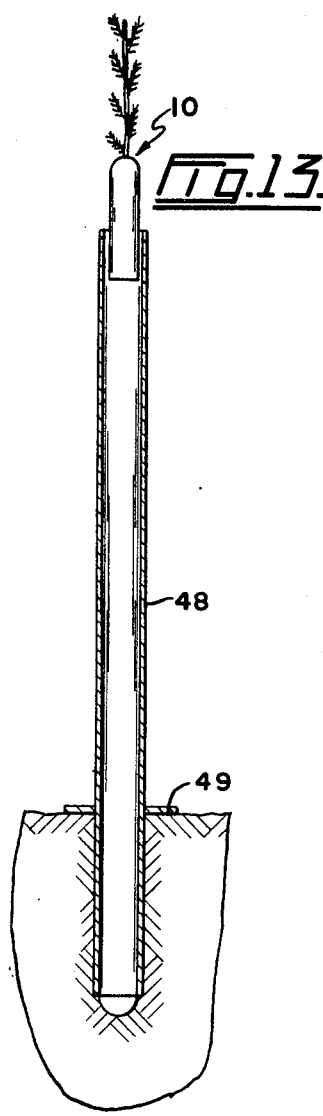

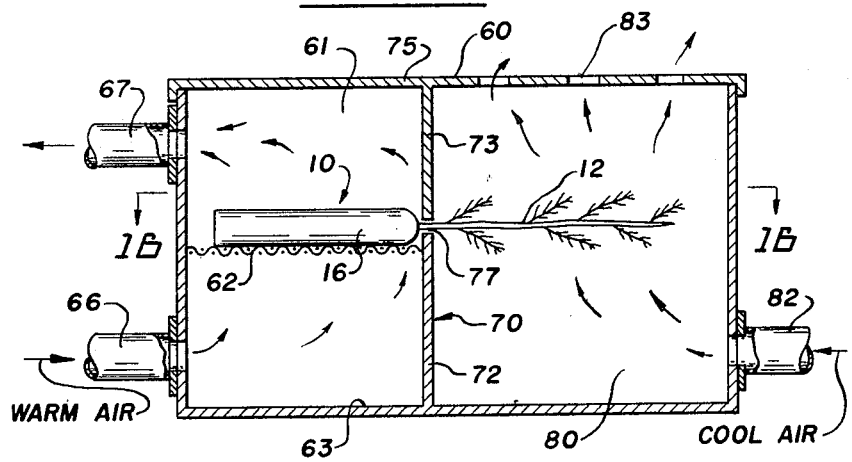
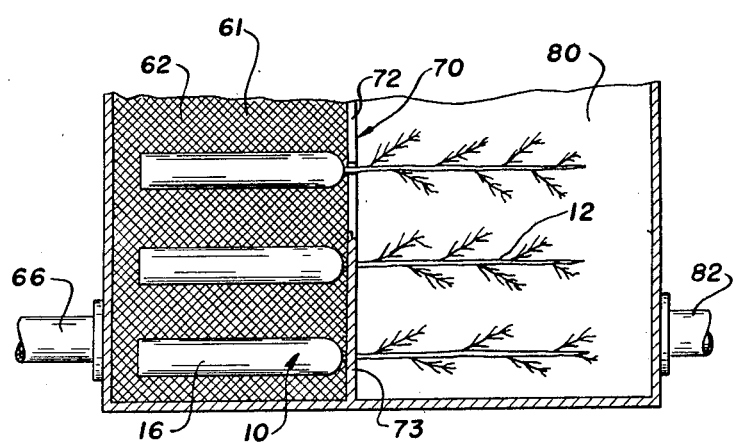

CONTAINERIZED TREE SEEDLING UNITS AND METHOD OF MAKING THESE UNITS

This is a continuation-in-part of application Ser. No. 757,991, filed Sept. 6, 1968, and now abandoned.

This invention relates to container units including tree seedlings for planting purposes, and methods of making these units.

The purpose of this invention is to improve the standard of planting, the percentage of survival and subsequent growth of forest tree seedlings when they are removed from nursery beds and transplanted in the forest, and to increase the period or time during which trees can be successfully transplanted. The improved survival will improve the results of reforestation projects by ensuring that the optimum number of trees are established per acre at a desired spacing. The improved growth rate will enable planted trees on denuded forest land to better compete with brush and undesirable vegetation so that areas reforested will remain in full stocked condition instead of yielding to fast growing brush. The better standard of planting will contribute to better survival and subsequent growth. The planting season can be extended well into the summer months since the seedling roots are protected from drying out during transportation and planting, and a supply of moisture is available for some time after the planting.

Areas not suitable for bare root planting, such as dry and rocky areas, can be reforested with containerized seedling units according to this invention since these include a supply of soil and moisture which are available until the tree roots get established in the surrounding ground.

At the present time, by far the majority of planting done in logged or burned over areas is by transplanting seedlings grown in forest nurseries for 1 to 3 years, then removed, transported and planted in bare-root condition. These seedlings in many cases are placed in cold storage (around 35° F) until required for planting. The trees are usually planted by digging a hole with a mattock placing the tree in the hole and pressing the soil around the roots.

Disadvantages of the bare root planting are:
1. The planting season is limited to when the tree is dormant during late fall, early spring, or winter. Snow and frost in winter limit the planting to two short periods. A crew must be organized twice a year for these short periods.
2. Because planting is for short duration and seasonal it is very difficult to maintain a steady crew of experienced planters. The job is monotonous and considered undesirable, and good quality planting is difficult to achieve. When planting standards are poor the chances of trees surviving is poor and the subsequent growth is retarded. The most common result of poor planting standards is severely deformed root systems.
3. A large percentage (40 percent) of bare-root planted trees die due to lack of moisture during hot summer months. In many cases large areas must be replanted to get the desired number of trees per acre, even in good soil.
4. Many areas, such as dry southerly exposed hillsides and rocky or slide areas, which previously grew trees, are not suitable for bare-root planting since the roots dry out during hot summer months.
5. Mechanization of bare-root planting is very difficult.
6. Much care is required to ensure that bare-root trees do not dry out during storage, transporting and planting. Exposure to the air for short periods can seriously reduce the chance of a tree surviving even if it is well planted.

The above problems are eliminated or greatly reduced by the containerized tree seedling units of the present invention. A unit according to this invention comprises a tree seedling with an elongated container around the roots thereof and adapted to be in direct contact with the surrounding ground when the unit is placed therein. This container includes moist clay-like mud within and around the roots, and is capable of absorbing moisture from the ground. The unit includes means for normally maintaining the container in a semi-rigid state to help the insertion thereof into a hole in the ground without interfering with the container absorbing moisture from the ground or the growing of the seedling.

A preferred form of containerized tree seedling unit includes a tree seedling with an elongated container formed of moist mud or clay pressed into and around the roots. Although it is preferable to press the moist mud or clay into and around the seedling roots, said seedling can be grown from a seed within the mud or clay. The stiffening means is achieved by rapidly drying the outer surface of the container so that it is rigid or semi-rigid. This drying case-hardens the container but does not penetrate very far into it so that the moist mud or clay is retained within the hardened outer surface of the container. This case-hardened outer surface keeps the moisture of the container therein for a comparatively long period. The case-hardening effect is lost if the container is dried relatively slowly. Gradual drying results in the container material drying right in to the center thereof, this harming the seedling roots, and leaving the latter without water for existence. With the present case-hardened container, the inner material of the container around the roots of the seedling retains the moisture for very long periods. When the container is placed in the ground, the hardened surface will absorb moisture from the ground, thereby softening and allowing the moisture to penetrate through the rest of the material of the container. Another important advantage is that the case-hardened container can be handled and planted immediately, thus making in situ manufacture possible. The container will protect the seedling even when planted under drought conditions.

A method according to the present invention comprises forming a layer of mud or clay, placing the roots of a seedling on this layer with the stem and needle part of the seedling projecting beyond an edge thereof, and rolling the layer over and around these roots while pressing the material of the layer into and around the roots. This tends to keep the roots spread out and not compressed into a tight bundle. The formed container is subjected to heat or drying for a short period sufficiently to case-harden it, but the heat or drying is not allowed to penetrate deep enough to affect the moisture within the container around the roots, or to damage the seedling. The maximum temperature to which the container and tree are subjected is around 70 to 75° F.

The seedlings are usually grown in nurseries for from 1 to 3 years, and then are removed in bare-root condition. The container is formed of soft mud or clay of any suitable type and which will mold into and retain a desired shape. This material must be relatively soft when moist so that it can be pressed into and around the roots without damaging them, and yet can be molded or pressed into elongated shape for handling and planting purposes. Any suitable good growing soil can be used.

It is preferable to mix the mud or clay with peat moss. The clay-like material acts something as a binder for the peat moss and, as is well known, the latter holds a very high percentage of water. If desired, suitable fertilizing material may also be added.

The relative amounts of clay, peat and water will depend upon the type of clay or mud, and the type of container to be formed. In the preferred form of the invention, the container mixture is made up of approximately 1 part clay (dry), 2 parts peat moss (dry), and 1 part water. If a stiffer mixture is required, the constituents are approximately 1 part clay, 3 parts peat moss, and 1 part water.

Examples of the present container unit and apparatus for manufacturing it are illustrated in the accompanying drawings, in which FIG. 1 is an elevation of a containerized tree seedling unit according to the present invention, FIG. 2 is a cross section taken on the line 2—2 of FIG. 1, FIG. 3 is a side elevation of an alternative form of the invention, FIG. 4 is a cross section taken on the line 4—4 of FIG. 3, FIG. 5 illustrates a containerized seedling unit placed in a hole in the ground before the earth is pressed around it, FIGS. 6 to 11 diagrammatically illustrate one form of apparatus for carrying out the method according to the present invention, FIG. 12 illustrates one form of apparatus for planting the seedling units in the ground, FIG. 13 is a view similar to FIG. 12, illustrating a seedling unit being fitted into the apparatus, FIG. 14 shows the seedling unit in the ground after the planting apparatus has been removed, FIG. 15 is a cross section through a drying chamber for case-hardening the seedling units, and FIG. 16 is a horizontal section taken on the line 16—16 of FIG. 15.

Referring to FIGS. 1 and 2 of the drawings, 10 is a containerized tree seedling unit according to the present invention comprising a tree seedling 12 having roots or a root system 14. An elongated container 16 is positioned around roots 14 and completely encloses the latter. This container is formed of moist clay-like material and peat moss moistened with water. The material of the container is pressed in and around roots 14, and afterwards quickly dryed for a short time to form a substantially rigid layer 18 of the clay over or forming the outer surface of the container. The clay and peat are quite soft when pressed into the root system so that the latter remains spread out as it should be and is not damaged. The drying is done quickly so that the inner area 19 of the container remains moist and the hardened layer 18 retains this moisture within the material, keeping it available for the seedling. Layer 18 is rigid enough to permit the unit to be handled, stored and planted without breaking.

When it is desired to plant the seedling, it is only necessary to take a rigid bar of a diameter slightly larger than the diameter of container 16 and to drive the bar down into the ground to make a hole 22, see FIG. 5. The rigidness of container 16 makes it possible to insert unit 10 into this hole quickly and easily, and the container protects the roots and keeps them in their proper position at this time. The depth of the hole is about equal to the length of the container so that seedling 12 projects upwardly above the ground surface. It is then very easy to press the earth around the unit container in order to eliminate the air space therearound.

The case-hardening of the container of the unit makes it possible to press the unit into a hole just large enough to accommodate it without interfering with the root structure of the seedling. Thus, the only tool necessary is a bar that can be driven straight down into the ground. This also makes it possible to plant in many areas where it is difficult, time-consuming, and even impossible to make holes with tools, such as mattocks. Furthermore, the planting can be done quickly and easily, and even immediately after the manufacture of the container unit. The container protects the seedling roots against damage during transportation, storage, and handling during the planting operation. Moisture is maintained around the seedling roots during this time so that the seedling remains in a good healthy state for considerably longer periods than is possible with a bare-root seedling.

Another advantage of this unit is that after planting the moisture is maintained around the root structure of the seedling during comparatively dry periods or during drought times when the surrounding ground is very dry. This enables the seedling to survive dry or sunny periods for quite a lengthy time after being planted, thereby making it possible to continue planting during the summer months. Moisture from the surrounding ground is absorbed by the rigid wall 18 of the container 16 so that said wall softens up and just becomes part of the soft material of the container and unites with the surrounding soil. At this time, moisture from the soil reaches the seedling roots, and the latter are able to develop without any interference. If the material of the container has fertilizer in it, this is available to the tree during this time. When the seedling is placed in the ground, there is nothing to be removed therefrom, but it is only necessary to press the ground around the container of the unit.

FIGS. 3 and 4 illustrate a containerized tree seedling unit 10a which is a slight variation of unit 10. In addition to case-hardening the material of container 16, a stick 25 formed of wood, plastic or other suitable material, is embedded within the clay and peat moss of the container when said material is pressed into and around the roots of seedling 12. The material of the container is pressed and molded around the roots and stick and maintains its general shape during storage, handling, transportation and planting. The stick remains in the ground, but does not interfere with the growth of the root system 14 of the seedling.

FIGS. 6–11 more or less diagrammatically illustrate one form of apparatus for carrying out the method according to the present invention. In these Figures, 30 represents a table with an elongated flexible sheet 31 fixedly secured at one end thereto in any suitable manner, such as by nails 32. This sheet may be made of any suitable flexible, strong and dimensionally stable material, such as the type sold under the trade mark "TEFLON." The opposite end of sheet 31 is connected to the lower edge of a blade 35 which has a handle 36 along its opposite edge. A counterweight 38 is connected to the blade centrally thereof on the opposite side of the blade from sheet 31. This counterweight projects outwardly relative to the blade at substantially right angles thereto so that it normally retains the blade in an upright position on the table, see FIG. 7.

When it is desired to produce a containerized tree seedling unit, the blade 35 is moved to stretch sheet 31 over the top of the table. Then a block of clay-like material 40 is laid on the sheet near blade 35. This block is comparatively thin, rectangular in shape, and contains sufficient mud or clay to produce a container 16. A tree seedling 42 is laid out with its root system 43 spread over block 40, as shown in FIG. 6. Then the operator grasps handle 36 and moves the lower edge of blade 35 up and over clay block 40 to bend the latter over the root system, as shown in FIG. 8. After this, the operator pressed the lower edge of the blade under roller block 40 to cause the latter completely to surround the root system, as shown in FIG. 9. This forms a cylinder of moist clay-like mud around the root system of the seedling and presses this material gently but firmly into the roots. Any excess material will flow out of the ends of the sheet roll wound around the clay material.

Blade 35 is now moved back around the roll, peeling sheet 31 off the clay, as indicated in broken lines in FIG. 9. Sheet 31 should have a smooth surface, and must be dimensionally stable so that it will not be pulled out of shape during the pressing or peeling action.

When the seedling is first laid on the clay block, the root collar or ground line 45 thereof is aligned with the edge 46 of sheet 31. When the sheet presses the clay around the root system, the sheet forms a cylinder and the clay is squeezed and therefore elongates within this cylinder until it reaches the root collar. Any excess clay at the collar is brushed off before the flexible sheet is removed. The opposite ends of the clay container and the roots, if they extend to the end of the container, can be trimmed off so as to produce containers of a uniform length.

This action has formed a body of clay-like material around the root system of the seedling, and when the opposite ends of the clay roll are pressed firmly together, the result is containerized tree seedling unit 10, such as shown in FIG. 11.

The above is essentially a hand operation, but is is obvious that the containerized units can be formed in other ways, such as in molds or the like.

Apparatus 60 is an example of apparatus for case-hardening the container 16 of seedling units 10, see FIGS. 15 and 16. Apparatus 60 includes a drying chamber 61 having a supporting screen 62 spaced above the chamber bottom 63. Warm or hot air is directed from a suitable source, not shown, by a pipe 66 into chamber 61 below screen 62, and is removed from said chamber above the screen through a pipe 67. A central wall 70 is formed in two vertically arranged sections 72 and 73 connected to chamber bottom 63 and a removable cover 75, respectively, of the chamber. The adjacent edges of these wall sections are separated to leave a slot 77 therebetween.

If desired, a cooling chamber 80 may be provided beside drying chamber 61, the top of this cooling chamber being closed by cover 75. Although not absolutely necessary, cooling air may be directed into the bottom part of chamber 80 by a pipe 82, said air escaping from the top of the chamber through perforations 83 in cover 75.

When it is desired to case-harden some seedling containers 18 in apparatus 60, cover 75 is removed, and the containers laid on supporting screen 62 with the seedlings extending over the upper edge of wall section 72 into cooling chamber 80. Then cover 75 is placed over chambers 61 and 80, and at this time wall screen 73 moves into place just above the seedlings 12 where the trunks thereof emerge from their respective containers 16, as clearly shown in FIG. 15. This leaves the containers in drying chambers 61 and the seedlings in cooling chamber 80.

Warm or hot air is directed through pipe 66 into chamber 61 where it passes upwardly through perforated support 62 and around containers 16 thereon. This air leaves the chamber through pipe 67. Wall 70 protects seedling 12 in chamber 80 from the drying air. If desired, cooling air may be circulated through chamber 80 to help protect the seedlings from the heat.

When the containers 16 are case-hardened, cover 75 is lifted off the apparatus so that the seedling units can be removed therefrom.

Although the warm air can be blown through drying chamber 62 fairly fast for a short time, it is preferable to move this air slowly for approximately 2 hours. The temperature of the air must not be high enough to injure the seedlings, and it has been found that the best results are attained with air temperatures around 70° to 75° F. The relative humidity of the drying air should be something of the order of 50 percent.

Case-hardening a seedling unit in this manner forms a thin dry layer at the outer surface of the container of the unit while leaving the material at the center of the container moist and soft. The container is left in the drying atmosphere only until the thin dry layer is formed. As this is done comparatively quickly very little of the moisture of the center of the container material has time to wick out to the outer layer to be removed by the heat. Thus there is a quick sealing effect that prevents the loss of any substantial amount of the moisture from the center of the container during the drying or case-hardening operation. It has been found that if the containers are allowed to dry over a comparatively long period, they harden right in to the center. It is believed that the interior moisture wicks out to the outer surface during the prolonged drying period.

This case-hardening of the seedling unit containers seals in the moisture around the root systems, protects said units from breakage during handling and storage, permits the units to be pressed into relatively small holes in the ground during planting, and makes it possible to handle and to plant the units as soon as the case-hardening has been effected.

FIGS. 12 to 14 merely illustrate a simple tool and technique for planting these tree seedling units. A tube 48 has a stop 49 on its outer surface spaced from the lower end of the tube a distance substantially equal to the length of the containers of the tree units to be planted. A rod 51 extends downwardly through the tube and has an enlarged end 52 which slidably fits in the tube. A stop 53 on this rod bears against the upper end of the tube to limit the downward movement of the rod so that only the tip or lower end of enlargement 52 projects beyond the lower end of the tube.

When it is desired to plant a seedling unit, tube 48 and rod 51 therein are driven downwardly into the ground until stop 49 engages the surface thereof. Then rod 51 is removed from the tube, and a seedling unit 10 is dropped down the tube into the ground, after which the tube is removed from the ground, leaving unit 10 therein, as illustrated in FIG. 14. The case-hardening of the container unit keeps said unit together and protects the seedling roots during this type of handling. As tube 48 is thin-walled, the hole it makes in the ground is just a little larger in diameter than container 16 of unit 10. In some cases nothing further needs to be done, but as a rule the ground is pressed against the container. This permits moisture to transfer from the ground into the material of the container, and as the roots of the seedling grow, they grow through the clay of the container into the surrounding ground. As stated above, the moisture within the container is available to the seedling roots during transportation, planting and dry weather periods after the planting.

I claim:

1. The method of producing a containerized tree seedling unit, which comprises wrapping around the root system of a tree seedling a thick layer of moist clay-like material, pressing said layer against the root system to cause some of said material to ooze into the root system and to form a container completely in contact with and enveloping said root system and capable by itself of protecting the latter during handling and planting, and case-hardening said container by exposing said container to a heated air flow at a temperature and for a time sufficient to dry an outer layer only of the material to a substantially rigid state, and leave within said layer a core of relatively moist and soft material enveloping the roots, said case-hardening being such as not to interefere with the container when inserted into the ground from absorbing moisture from said ground or the growing of the seedling.

2. The method according to claim 1 which comprises mixing wet peat moss with said clay-like material before the latter is pressed around the root system of the seedling.

3. The method according to claim 1 which comprises mixing a fertilizer with said clay-like material before the latter is pressed around the root system of the seedling.

4. The method according to claim 1 in which the temperature of the flowing air is maintained around 70° to 75° F.

5. The method according to claim 4 in which the container is exposed to said flowing air for about 2 hours.

6. The method according to claim 5 in which the relative humidity of the flowing air is maintained at about 50 percent.

7. The method according to claim 1 including protecting the seedling of the container from said warm air.

* * * * *